(No Model.)
R. McLAUGHLIN.
FIFTH WHEEL.
No. 360,609. Patented Apr. 5, 1887.
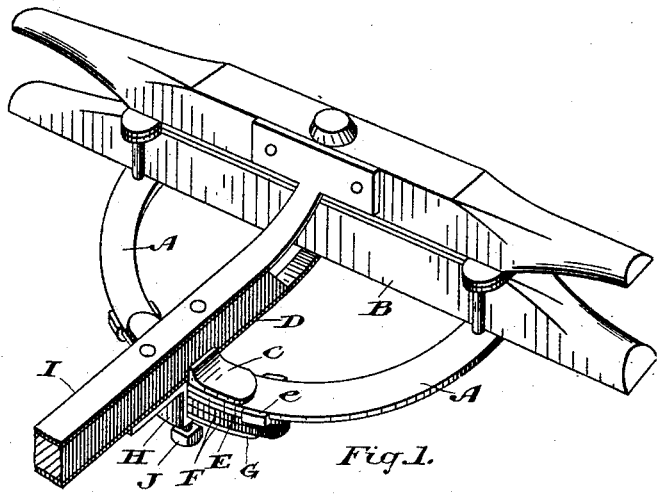
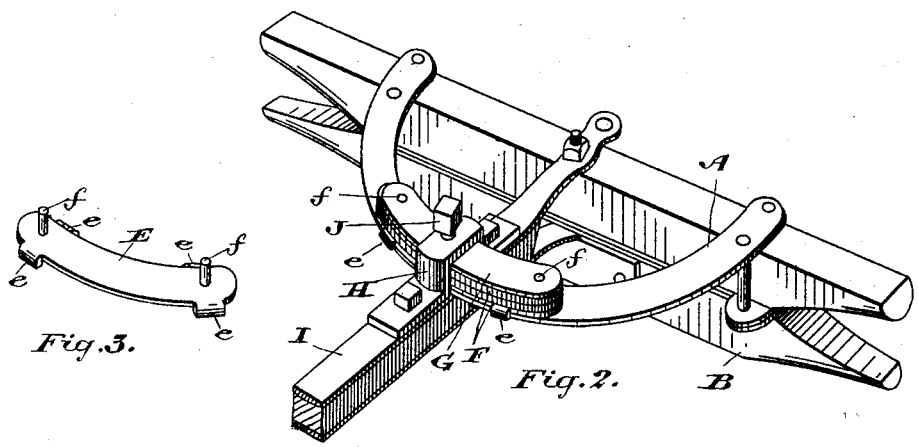
Witnesses.
James E. Mayhew
J. M. Jackson
Inventor.
R. McLaughlin
by Donald C. Ridout & Co
Atty

UNITED STATES PATENT OFFICE.

ROBERT McLAUGHLIN, OF OSHAWA, ONTARIO, CANADA.

FIFTH-WHEEL.

SPECIFICATION forming part of Letters Patent No. 360,609, dated April 5, 1887.

Application filed October 18, 1886. Serial No. 216,526. (No model.)

*To all whom it may concern:*

Be it known that I, ROBERT MCLAUGHLIN, of the town of Oshawa, in the county of Ontario, in the Province of Ontario, Canada, manufacturer, have invented certain new and useful Improvements in Fifth-Wheels, of which the following is a specification.

The object of the invention is to prevent the noise or rattle occasioned by the turning of the fifth-wheel and jolting of the vehicle; and it consists, essentially, of a wear-iron situated above the circle of the fifth-wheel and notched to receive the under reach-plate iron, another plate or wear-iron being provided underneath the circle, with two lips or flanges turning upwardly on each side of the fifth-wheel, the said wear-iron being also provided with two pins situated near each end of it, which pins pass through a layer or layers of rubber or other pliable material and also through a pressure-plate, the said pressure-plate being adjusted by means of a set-screw working in a bracket which is bolted underneath the reach-plate and surrounds the said plate and layer or layers of rubber, the whole being designed to allow of a free and easy movement of the fifth-wheel, substantially as hereinafter more particularly explained.

Figure 1 is a perspective view of my fifth-wheel. Fig. 2 is a bottom view of the same. Fig. 3 is a detail of the under wear-iron.

A is a fifth-wheel suitably connected to the axle B of the vehicle and passing beneath the wear-iron C, which is recessed at its center portion, so as to receive the under reach-iron, D. Beneath the fifth-wheel A, I place another wear-iron, E, which has two flanges or lips, $e$, formed on each side of the circle of the fifth-wheel A, as shown, so as to form a guide therefor. Beneath the wear-iron C, I place a layer or layers of rubber, F, and what I term a "pressure-plate," G.

It will be noticed on reference to Fig. 2 that the pins $f$, formed on the end of the wear-iron E, project through the layer or layers of rubber F and pressure-plate G, and thus keep the plate and layer or layers of rubber in position.

H is a bracket, formed substantially as shown in Fig. 2 and bolted to the reach I. In this bracket H, I place the set-screw J, which bears upon the pressure-plate G, and by this means I can regulate the pressure on the circle of the fifth-wheel. The set-screw J is so formed at the end that it cannot come out of the bracket H.

What I claim as my invention is—

The combination, with the fifth-wheel A and the reach, of the wear-iron C on said fifth-wheel and recessed to receive said reach, the wear-iron E, having lips $e$ to embrace and guide the fifth-wheel, and oppositely-extending pins $f$, the pressure-plate G, sleeved on said pins, the layer or layers of rubber F between the plate G and wear-iron E, and through which pins $f$ pass, the bracket H, embracing said wear-irons, pressure-plate, and rubber, and the set-screw J, passed through said bracket and bearing on the pressure-plate, substantially as shown and described, and for the purpose specified.

Signed at Oshawa, this 20th day of September, 1886.

ROBERT McLAUGHLIN.

In presence of—
J. W. PALMER,
S. J. MARTIN.